United States Patent
Armbruster et al.

(10) Patent No.: US 6,374,447 B1
(45) Date of Patent: Apr. 23, 2002

(54) CORDLESS RECHARGEABLE POWERED WASHING SYSTEM

(76) Inventors: Joseph M. Armbruster; Sue B. Armbruster, both of 2700 NE. 47 St., Lighthouse Point, FL (US) 33064

(*) Notice: Subject to any disclaimer, the term of this patent is extended or adjusted under 35 U.S.C. 154(b) by 0 days.

(21) Appl. No.: 09/292,969

(22) Filed: Apr. 16, 1999

(51) Int. Cl.[7] ................ A46B 13/02; A47L 11/283
(52) U.S. Cl. .............. 15/28; 15/97.1; 15/49.1; 15/144.1
(58) Field of Search ............ 15/23, 28, 97.1, 15/144.1, 22.1, 49.1

(56) References Cited

U.S. PATENT DOCUMENTS

| | | | |
|---|---|---|---|
| 4,964,398 A | * 10/1990 | Jones | |
| 5,289,605 A | 3/1994 | Armbruster | |
| 5,353,461 A | * 10/1994 | Enriquez | 15/97.1 |
| 5,423,102 A | * 6/1995 | Madison | 15/28 |
| 5,500,972 A | * 3/1996 | Poster | 15/28 |
| 5,701,625 A | * 12/1997 | Siman | 15/97.1 |
| 5,784,744 A | * 7/1998 | Toran | 15/97.1 |
| 5,870,790 A | * 2/1999 | Root | 15/28 |
| 5,956,792 A | * 9/1999 | Gutelius | 15/97.1 |
| 5,960,503 A | * 10/1999 | Del Pozo | 15/97.1 |
| 6,058,542 A | * 5/2000 | Lo | 15/28 |

FOREIGN PATENT DOCUMENTS

| | | | |
|---|---|---|---|
| JP | 06304116 | * 11/1994 | 15/28 |

\* cited by examiner

*Primary Examiner*—Randall E. Chin
(74) *Attorney, Agent, or Firm*—Jacobson Holman, PLLC

(57) ABSTRACT

A hand manipulated cordless rechargeable powered washing system powered by an electric motor and a rechargeable battery. The washing system includes an apparatus that is lightweight, self contained and submersible. The motor is a high speed motor having dual planetary reduction gear set to reduce the output to a low rpm high torque drive. The DC motor is powered by a rechargeable stick battery on the housing or on a handle attached to the housing. Interchangeable brushes can be used with different bristle arrangements. The handle is an elongated wand type handle having a U-shaped yoke at one end pivotally connected to the motor housing and includes a lock mechanism engaging a portion of the motor housing to lock the motor housing in rigid predetermined angular relation to the longitudinal axis of the wand type handle to enable a non-concentric, non-perpendicular bristle brush to be rigidly associated in a desired angular relation to the handle.

21 Claims, 6 Drawing Sheets

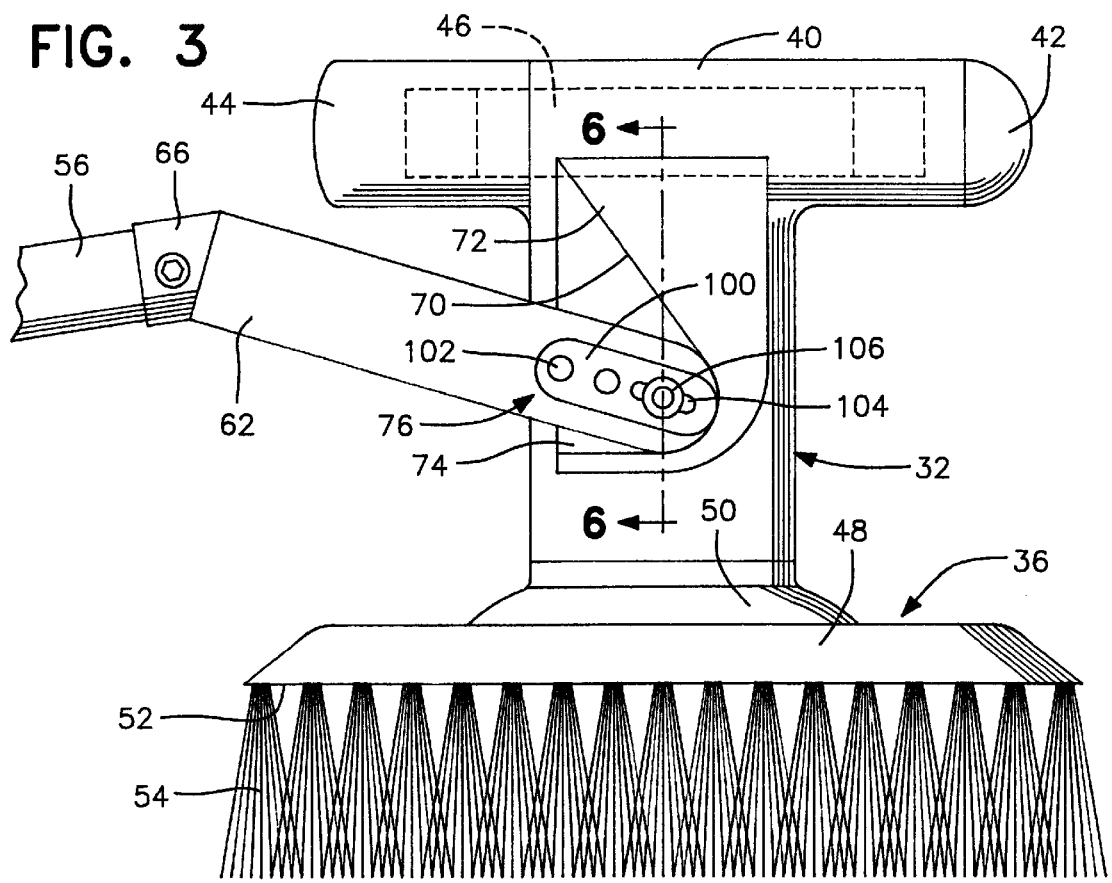
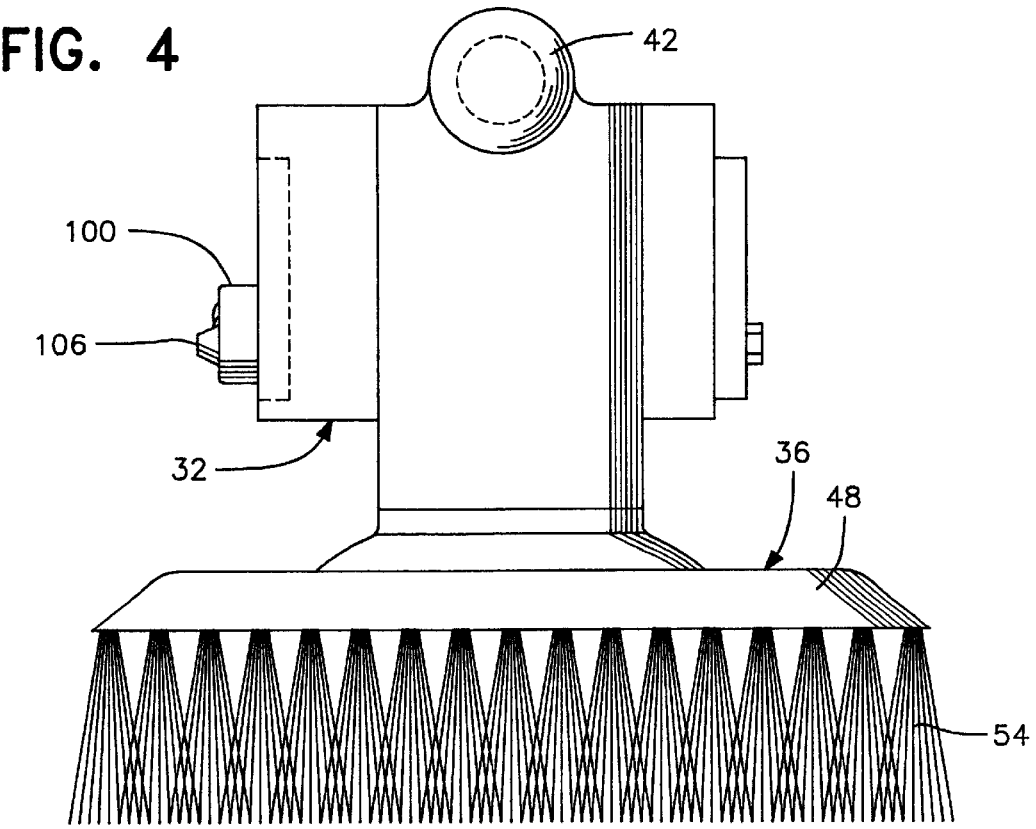

CORDLESS RECHARGEABLE POWERED WASHING SYSTEM

BACKGROUND OF THE INVENTION

1. Field of the Invention

The present invention is a cordless, waterproof hand manipulated powered washing system powered by an electric motor and a rechargeable battery and which is lightweight, self contained and submersible.

2. Description of the Prior Art

Various devices have been provided to facilitate washing various surfaces and devices such as washing cars by individual owners of vehicles which is preferred by many vehicle owners since commercial car washing operations frequently do not properly clean all surface areas of a vehicle. One example of this type of washing apparatus is disclosed in U.S. Pat. No. 5,289,605, issued Mar. 1, 1994. Other types of washers include water or air driven brushes which tend to wash or blow most detergent off the surface to be cleaned before the detergent can act.

The prior art does not include a powered washing system utilizing the features of the present invention including the association of a wand type handle in selective locking angular engagement with the motor housing and rotational axis of selective brushes. Further, the prior art does not disclose interchangeable disk type brushes in which the bristles are of unequal length and perpendicular to the flat surface of the mounting disk or a brush having bristles oriented in acute angular relation to the flat surface of the disk with the disk rotating about a non-concentric axis and the bristles varying in length from longer bristles at one side of the disk and shorter bristles at the opposite side of the disk. Also, the prior art does not disclose a rechargeable stick battery unit incorporated into a split housing for the motor and does not include a alternative higher voltage, more powerful rechargeable battery unit mounted at the handle end of the wand type handle of the washing apparatus.

SUMMARY OF THE INVENTION

The cordless rechargeable powered washing system of this invention includes a high RPM motor driving through a dual planetary gear set producing high torque and low RPM final drive output with the motor being powered by a rechargeable battery. The washing system includes rotary interchangeable brushes with one brush being a generally circular disk with perpendicular or angled bristles for washing generally flat and smoothly curved surfaces on a vehicle or any other surface that needs scrubbing. Another brush includes bristles attached to a flat surface of a disk in a non-perpendicular angular relation and varying in length at opposite sides of the disk to form a bristle pattern offset from the rotational center of the disk and oriented in approximately 70° acute angular relationship to the flat surface of the disk so that the tip ends of the bristles are inboard of the periphery at one side of the disk and outboard at the other side. This unique bristle configuration permits the bristles to enter into tight areas, whether straight or radiused to remove dirt and contamination with a wiping or sliding action thereby enabling road wheel cleaning including tightly curved recessed areas and other areas that are inaccessible to a flat disk brush to permit cleaning of various items. The brush disks are relatively stiff and a relatively soft rubber bumper is mounted or formed on the periphery of the disk and may extend inwardly along the upper surface thereof.

The hand manipulated washing apparatus includes an elongated wand type handle having a U-shaped yoke at one end pivotally connected to a motor housing which includes a motor and a dual planetary reduction gear set, a rechargeable stick battery and a push-on push-off switch. The wand type handle and yoke includes a lock mechanism engaging a portion of the motor housing to lock the motor housing in rigid predetermined angular relation to the longitudinal axis of the wand type handle to enable the non-concentric, non-perpendicular bristle brush to be rigidly associated in a desired angular relation to the handle. In another embodiment of the invention, the elongated wand type handle is provided with a rechargeable battery unit at the hand gripping end thereof which is connected to the motor through the handle to provide a higher voltage, more powerful and longer lasting rechargeable power source. The elongated wand type handle enables a user to stand on the ground to wash vehicles or other surfaces without requiring a stepladder or other elevated support to wash the roof of vans, sport utility vehicles, buses, small airplanes, boats, building surfaces and the like. This provides a substantial safety factor by eliminating falls which can easily occur when a user is standing on wet stepladders which may also have a slippery detergent mixture thereon. Also, those of advanced age and disabilities can effectively use the washing apparatus.

An object of the present invention is to provide a cordless, rechargeable powered washing system that will safely clean any automotive paint, clear coat paint, chrome, aluminum, anodized aluminum, cloth, canvas, rubber, plastic, glass, clear plastic, or any other surfaces such as those normally encountered on a vehicle including the road wheels, hub caps, wire wheels, wheel covering disks and all materials and types of materials currently used in the construction of various vehicles including but not limited to cars, trucks, vans, sport utility vehicles, aircraft as well as the surface of various household items especially outdoor items such as patio furniture having intersecting straps, plastic components and the like. The washing system can be effectively used to clean bathroom surfaces, tile surfaces, tile floors, shower stalls, pets, large and small animals.

Another object of the invention is to provide a battery powered washing apparatus which is lightweight, self contained, submersible, rechargeable and provided with interchangeable brush units.

A further object of the invention is to provide a cordless rechargeable powered washing system used in association with a separate garden type water hose preferably having a rotary spray discharge pattern of selective characteristics and a separate pump or spray type dispensing apparatus for detergent to be used after a sharp water spray has been used to remove loose dirt, mud and the like with the detergent being sprayed on the wetted surface and the brush of the washing apparatus of this invention then being activated to clean the surface to be cleaned by starting at the top and washing downwardly.

Still another object of the present invention is to provide a cordless rechargeable powered washing system as set forth in the preceding objects in which the interchangeable brush units includes a circular disk having a flat surface with bristles of equal length extending perpendicular to the flat surface and a brush having a disk with a flat surface in which the bristles are oriented in acute angular relation to the flat disk surface with the bristles at one side of the disk being longer than those at the other and the disk being connected to a rotary output of a drive motor in eccentric relation to the center of the disk to produce a sliding action of the bristles to enable sliding engagement with sharp cylindrical surfaces, recesses and other generally non-accessible areas especially those found in cast road wheels, hub caps, wire wheels, wheel disks and the like to enable road dirt and grim to be removed as well as brake dust which has a particularly strong affinity to the surfaces on which such dust is deposited during normal use of the vehicle.

A still further object of the invention is to provide a washing system including a motor housing connected to a wand type handle either of fixed length or telescopically adjustable and having a yoke at one end pivotally connected to the motor housing and provided with a selective locking mechanism to lock the motor housing and elongated handle in predetermined angular relation with the weight of the motor and brush unit providing sufficient downward force for the brush to clean the surface without downward force being applied to the handle to enable users with arthritis or carpal tunnel syndrome to use the washing system.

These together with other objects and advantages which will become subsequently apparent reside in the details of construction and operation as more fully hereinafter described and claimed, reference being had to the accompanying drawings forming apart hereof, wherein like numerals refer to like parts throughout.

BRIEF DESCRIPTION OF THE DRAWINGS

FIG. 3 is an elevational view of the right side of the washing apparatus, on an enlarged scale, illustrating the lock structure mounted on the yoke of the handle to lock the handle in angular relation to the motor housing;

FIG. 4 is an end view of the washing apparatus;

DESCRIPTION OF THE PREFERRED EMBODIMENT

Figure 1:
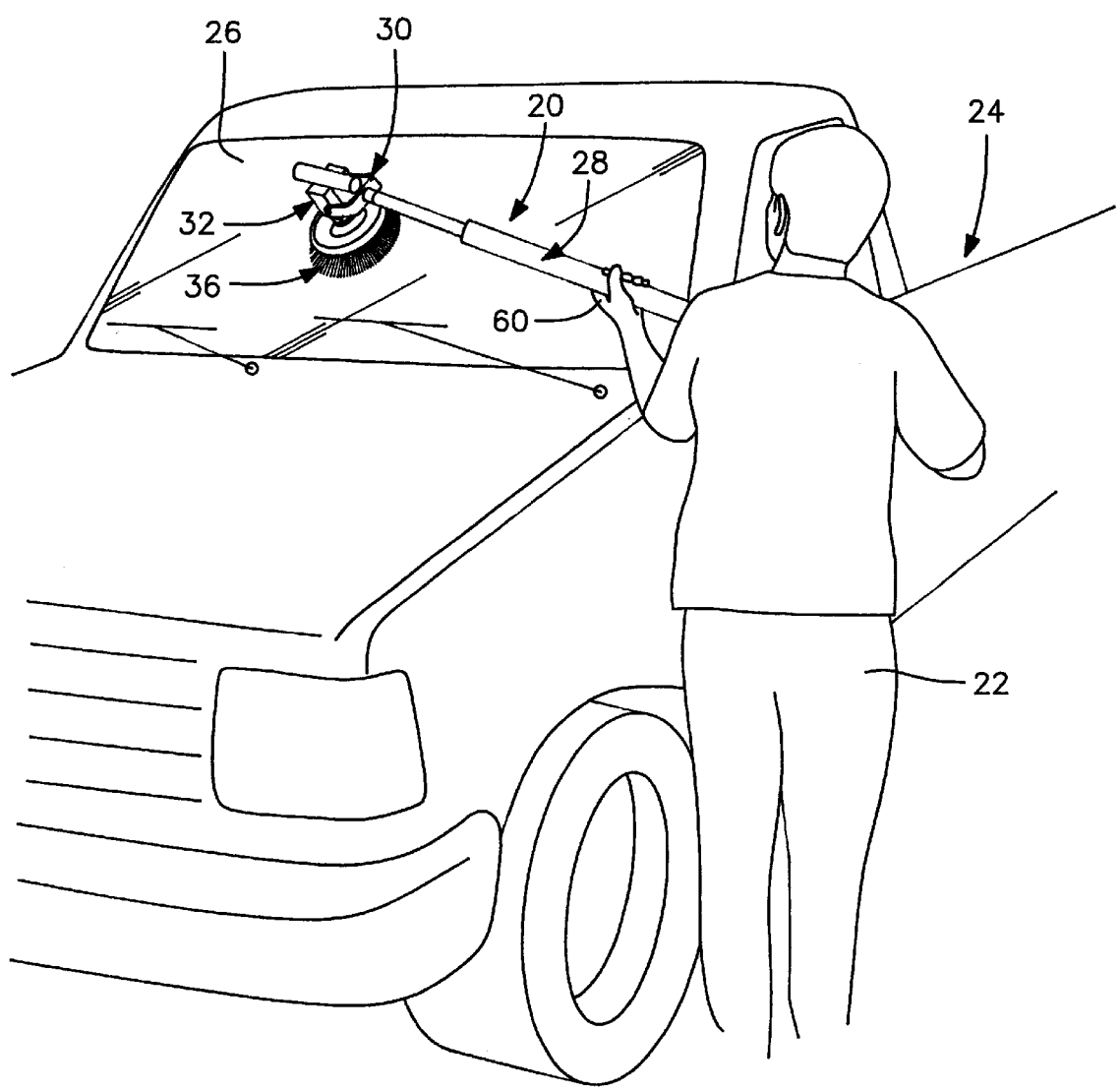
FIG. 1 is a perspective view of the cordless rechargeable powered washing system of the present invention illustrating the manner in which the system is used to clean the surfaces of a vehicle.

Although only one preferred embodiment of the invention is explained in detail, it is to be understood that the invention is not limited in its scope to the details of construction and arrangement of components set forth in the following description or illustrated in the drawings. The invention is capable of other embodiments and of being practiced or carried out in various ways. Also, in describing the preferred embodiment, specific terminology will be resorted to for the sake of clarity. It is to be understood that each specific term includes all technical equivalents which operate in a similar manner to accomplish a similar purpose.

Referring to the drawings, the cordless rechargeable powered washing system of the present invention includes a washing apparatus generally designated by reference numeral 20 and, as illustrated in FIG. 1, a user 22 standing on the ground can utilize the washing apparatus 20 to engage all surfaces of a vehicle generally designated by reference numeral 24 including the windshield 26. The washing apparatus 20 includes an elongated wand type handle 28 having a yoke 30 on one end thereof which straddles and pivotally connects to a housing 32 having a high speed DC motor and dual planetary reduction gear sets to reduce the RPM and increase the torque of output 34 to provide a constant speed brush generally designated by reference numeral 36 and which can be detachably connected by a coupling unit 38. The motor may have an output speed of 12 to 15 thousand RPM which is reduced by the dual planetary gear sets to 300–400 RPM. Both the motor and gear sets have sealed housings for waterproof operation. The housing 32 includes a battery housing 40 at the upper end thereof which is in perpendicular relation to the vertical axis of the housing 32 and includes a push-on push-off switch 42 at one end thereof and a sealed rerovable cap 44 at the other end thereof to enable a stick battery 46 or other rechargeable battery to be replaced when necessary. The switch 42 is sealed in relation to the battery housing 40 as is the cap 44 and the housing 32 .as well as the housing 40 may be constructed of two individual pieces having a sealed joint along the opposed edge surfaces similar to the seal joint used in a watch case.

The brush 36 includes a circular disk 48 having a socket 50 therein for detachable engagement with the coupling 38. The brush.36 includes a flat surface 52 in which a plurality of bristle tufts 54 are mounted with the bristles being in perpendicular relation to the flat surface 52 and being of the same length throughout their extent. This type of brush is especially useful in washing the windshield 26 and other generally flat or smoothly curved surfaces of the vehicle including the roof, trunk lid, hood, fenders, bumpers and other surfaces of various types of vehicles and surfaces of many other devices, items or structures. The brush and bristles will not catch on sharp edges on the vehicles such as rain gutters, grill areas, windshield wipers and the like.

Figure 2:
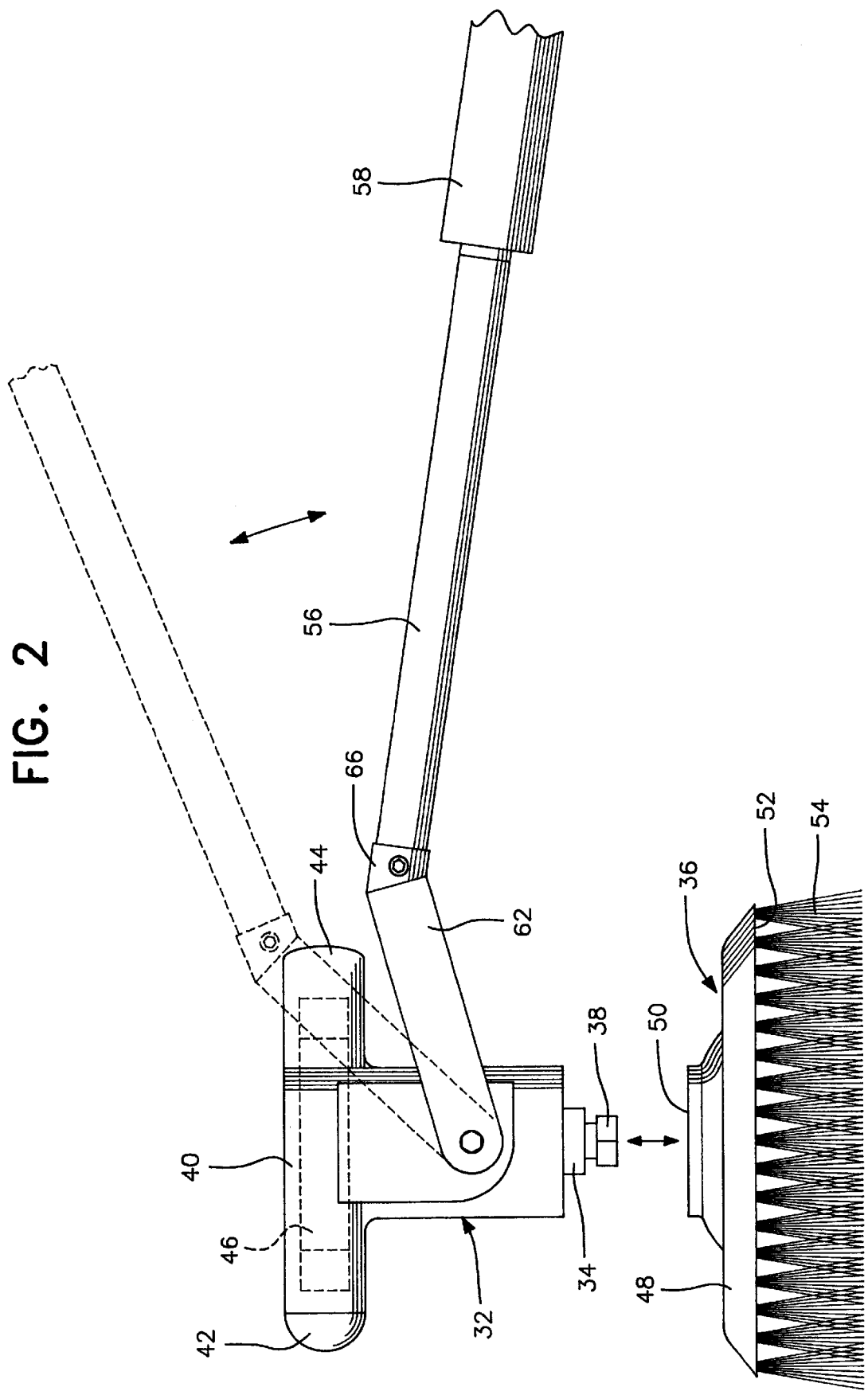
FIG. 2 is a left side elevational view of the washing apparatus.
Figure 5:
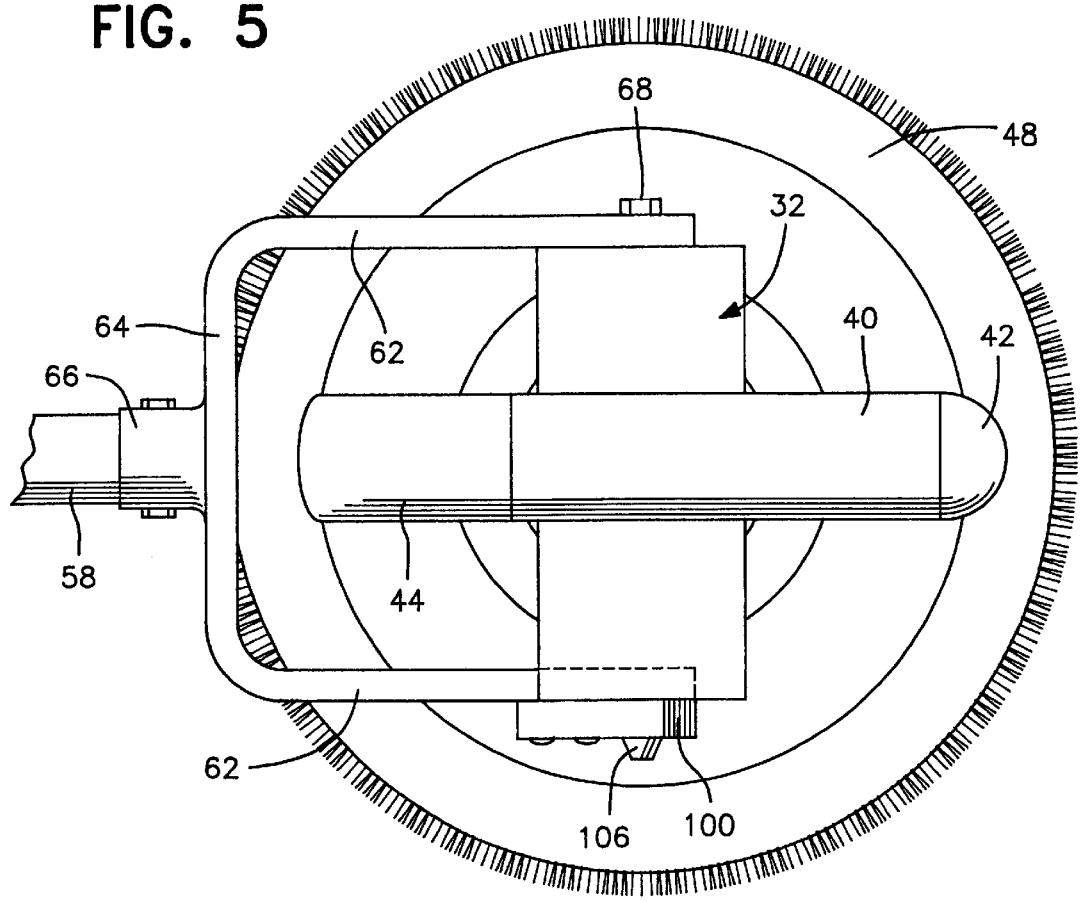
FIG. 5 is a top plan view of the washing apparatus.
Figure 6:
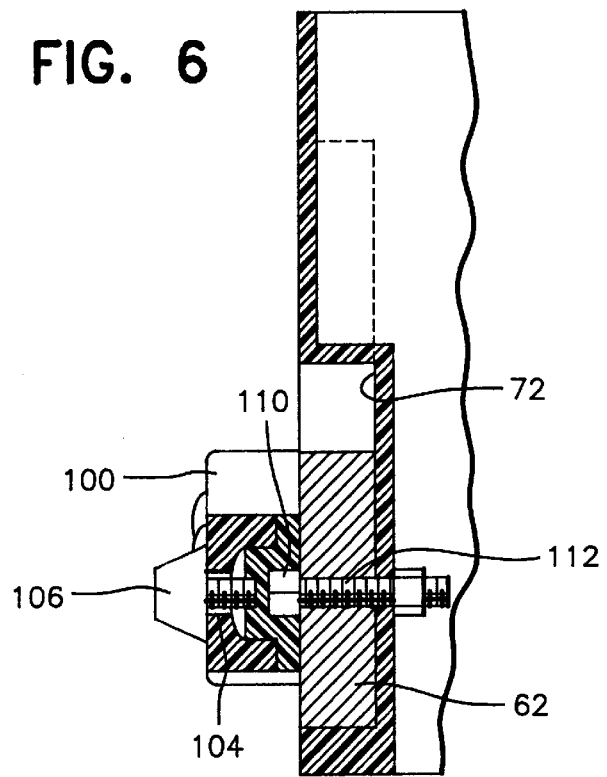
FIG. 6 is a sectional view of the lock structure.

The wand type handle 28 includes a rigid rod or tubular member 56 having an elongated sleeve 58 of resilient material such as foam plastic or foam, rubber to enable the user 22 to more effectively grip and manipulate the washing device by gripping engagement by-the hands 60. The yoke 30.includes a pair of spaced parallel legs 62 interconnected by a rigid bight portion 64 that is rigidly connected to the elongated member 56 at a socket and fastener type connection 66 as illustrated in FIG. 2. The yoke 30 is pivotally connected to opposite sides of the motor housing 32 to pivot about a transverse axis 68. The opposite sides of the motor housing include recesses 70 which receive the legs 62 of the yoke 30 with the side recesses 70 including an upper stop shoulder or surface 72 and a lower stop surface or shoulder 74 to limit the pivotal movement of the motor housing 32 in relation to the yoke 30 and the handle 28 but enabling free pivotal movement when the disktype brush 36 is used with the pivotal movement being limited by the stop surfaces or shoulders 72 and 74 in opposite portions of the housing 32.

Figure 7:
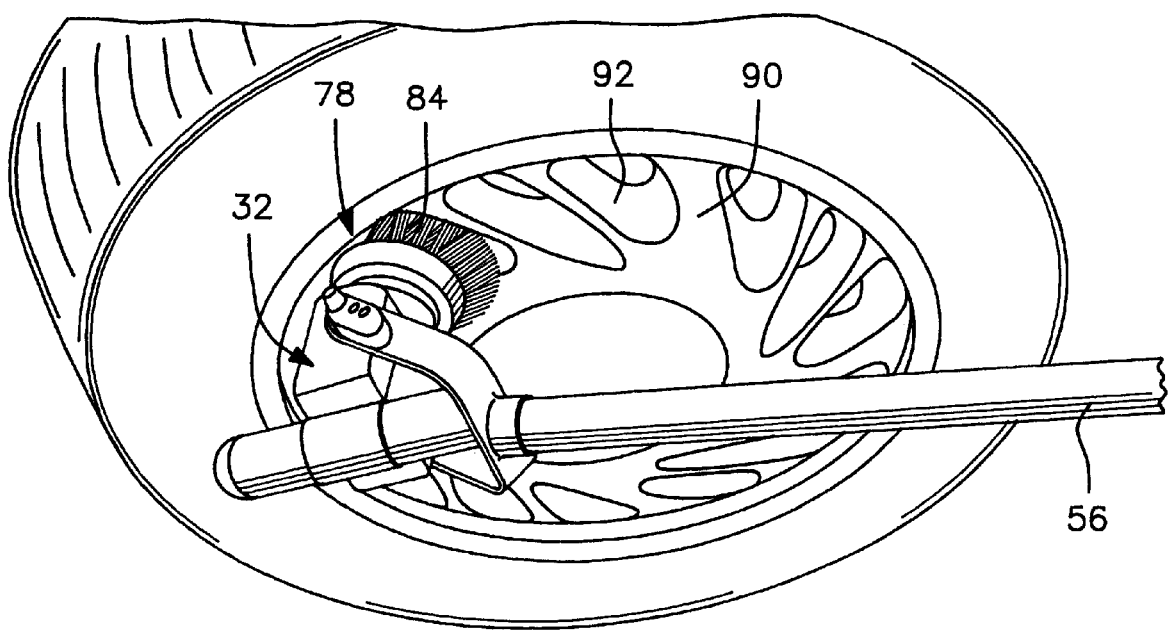
FIG. 7 is a perspective view illustrating the wheel washing brush in use.
Figure 8:
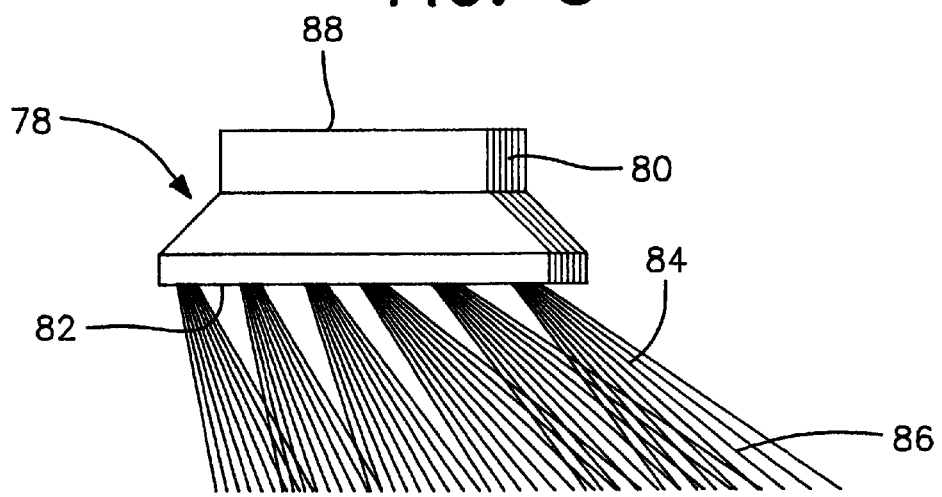
FIG. 8 is a side elevational view of the wheel brush.

As illustrated in FIG. 3, the right side yoke leg 62 is provided with a manual lock mechanism 76 to lock the angular relation between the handle 28 and the motor housing 32. The lock structure is moved to its locking position when the disk type brush 36 is removed and a brush 78 is installed by connection with coupling 38 for washing car wheels as illustrated in FIG. 7. The brush 78 includes a circular disk 80 having a flat surface 82 and brush bristle tufts 84 oriented in acute angular relation to the flat surface 82 with the angular relation being generally about 70° in relation to the flat surface. Also, the bristle tufts are longer at one side portion of the brush with those bristles being designated by reference numeral 86 as compared to the relatively shorter bristles at a diametrically opposed portion of the circular brush 78. Also, the brush 78 includes-a socket connection 88 that engages the coupling 38 in off center relation so that the rotational axis of the brush 78 is spaced radially from the center of the brush 78 thus causing the brush to move in an orbit when engaging a surface to cause the brush bristles to engage the rounded and inaccessible surfaces such as those on a cast wheel 90 as illustrated in FIG. 7 with the angular relation between the handle 28 and the housing 32 and the brush 78 being rigid in order to enable the long and short bristles and the eccentric rotational axis of the brush to engage and clean curved generally inaccessible surface areas 92 on the wheel 90 as illustrated in FIG. 7. The specific details of the wheel brush 78 and the bristle tufts 84 and 86 are illustrated in more detail in FIG. 8 showing the longer bristles outboard of disk 80 and the shorter bristles inboard of the disk. The bristles engage with the surfaces in a sliding motion which produces a wiping action for more effective cleaning of the curved and inaccessible surfaces on the wheel or on wheel covers, wire wheels and other surfaces. These surfaces frequently are covered with brake dust which is attached to the surfaces in a manner that makes the dust difficult to remove and which usually requires manual application of a brush, cloth or the like to the various surfaces by using the fingers or hand thus requiring considerable time and effort by the person cleaning the wheels while in an awkward leaning or bending over position.

Figure 9:
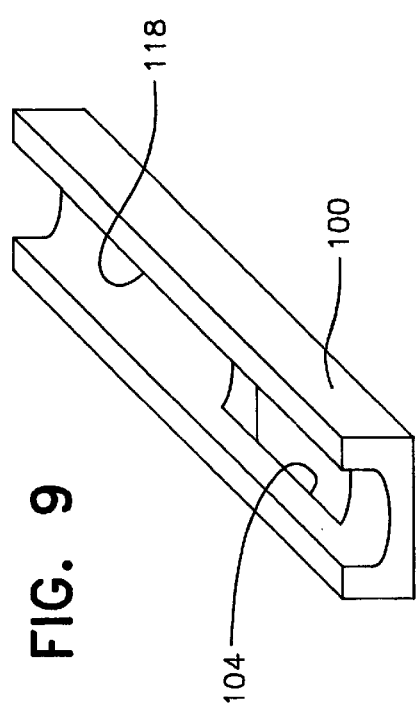
FIG. 9 is a perspective view illustrating the housing component of the yoke lock separated from the yoke and inverted.
Figure 10:
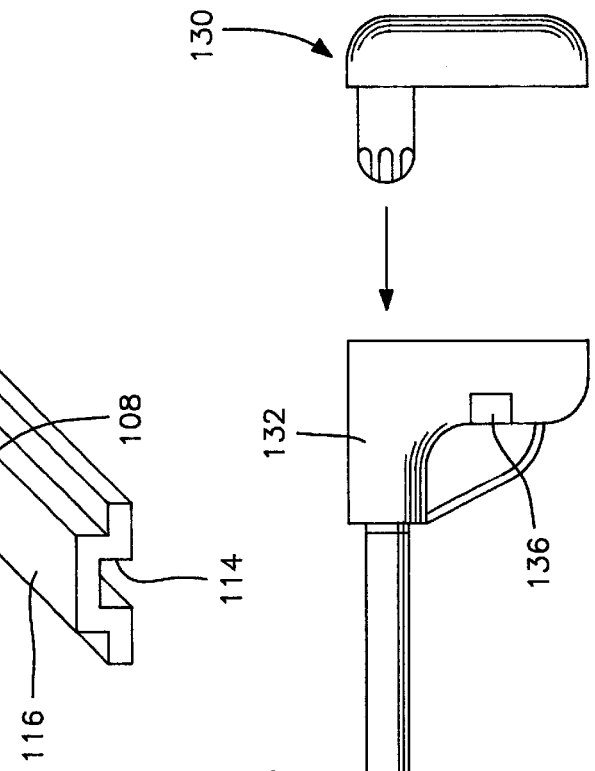
FIG. 10 is a perspective view illustrating details of the slide lock for the yoke handle and motor housing.

The lock mechanism 76 is illustrated in more detail in FIGS. 9–10 and includes a stationarily supported housing, 100 secured to the exterior of the yoke leg 62 by fastening screws 102. The end portion of the housing 100 adjacent the tip end of the yoke leg 62 is provided with a slot 104 through which a threaded locking knob 106 extends which is threaded into a generally channel shaped slide lock 108 as illustrated in FIG. 10 which slidingly engages a projecting tongue 110 that is rigid with a shouldered bolt 112 which pivotally secures the yoke leg 62 to the housing 32. An internal channel 114 on the slide lock 108 engages the tongue 110, and an upper rib 116 of the slide lock 108 engages a recess 118 in the inner surface of the housing 100 to lock the yoke 30 in angular relation to the housing 32 thereby stabilizing the rotational axis of the brush 78 when being used as illustrated in FIG. 7 to clean the surfaces 92 on the wheel 90. The lock knob 106 is screw threaded into a threaded bore 120 in the rib 116 of the slide lock 108 and extends through the slot 104 in the housing so that the knob provides a handle for moving the slide lock, and also it is screwed down tight to lock the slide lock in either locked or unlocked position. A spring device can be used to retain the slide lock in position if desired and both pivot bolts for connecting both yoke legs 62 to the housing 32 are in the form of shouldered bolts provided with friction washers or wear washers to maintain longevity of the pivotal connection between the yoke and housing.

Figure 11:
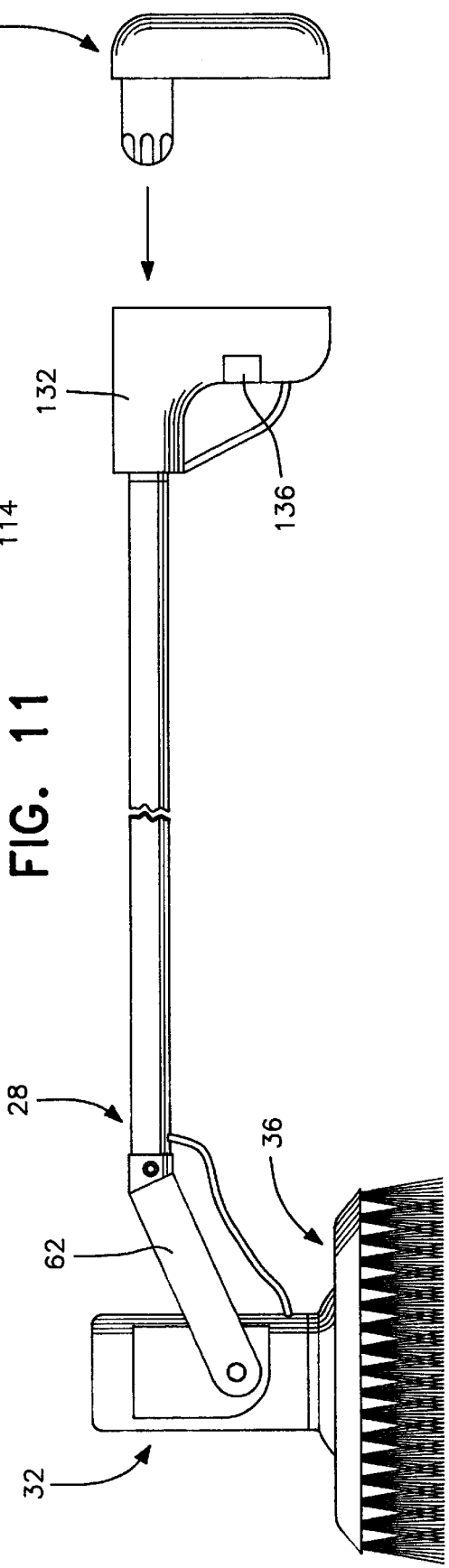
FIG. 11 is a side elevational view illustrating a high voltage battery pack associated with the hand grip end of the wand type handle.

FIG. 11 illustrates a high voltage battery unit 130 inserted into an adaptor 132 on the end of the handle 28 with contacts 134 engaging contacts in the adaptor 132 with the adaptor also including a button type release 136 for the rechargeable battery unit 130. The inserted contact area is provided with a seal to render the battery unit 130 waterproof in relation to the adaptor 132. The unit 130 may be removed and inserted into an appropriate recharging device and provides a higher voltage than the battery stick 46 illustrated in FIGS. 1–10 thereby providing a longer lasting and stronger power unit for driving the car washing apparatus.

The foregoing is considered as illustrative only of the principles of the invention. Further, since numerous modifications and changes will readily occur to those skilled in the art, it is not desired to limit the invention to the exact construction and operation shown and described, and, accordingly, all suitable modifications and equivalents may be resorted to, falling within the scope of the invention.

What is claimed is:

1. A cordless, rechargeable powered washing system comprising a washing apparatus having a DC motor and a motor housing, said motor including an output coupling, a rotary brush connected to the output coupling, an elongated handle having a yoke at one end pivotally connected to said motor housing and a hand grip area at the other end to enable a person to stand on the ground and wash all surfaces to be cleaned, said motor housing including stop surfaces limiting pivotal movement of the handle in relation to the motor housing to enable the brush to conform to the surfaces being washed, said brush including a circular disk with a soft rubber peripheral protector, and bristles projecting from a flat disk surface, said yoke and said motor housing including a locking device selectively moved between a released and locked position to selectively lock the motor housing and handle in angular relation.

2. The washing system as defined in claim 1, wherein said brush includes bristles oriented in acute angular relation to a flat circular disk surface of the brush, said flat disk surface being connected to the coupling in eccentric relation to the center of the disk surface to move the bristles in an orbiting pattern.

3. The washing system as defined in claim 2, wherein the bristles at one side of the disk are longer than the bristles at an opposite side of the disk to provide a sliding action of the bristles against a surface being cleaned.

4. The washing system as defined in claim 1, wherein said housing includes a transversely extending tubular housing for a rechargeable battery unit, a water sealed push-on push-off switch for the battery unit, said housing being water sealed to enable submersion of the unit during operation.

5. The washing system as defined in claim 1, wherein said handle includes a rechargeable battery unit attached to the end thereof remote from the pivotal connection with the housing with the battery unit electrically connected to said DC motor and being detachable from the handle for recharging.

6. The washing system as defined in claim 1, wherein said locking device includes a slide lock mounted on a leg of said yoke, said slide lock including a slot, said motor housing including a tongue rigid with the housing, said tongue being received in said slot to lock the housing and yoke in selected angular relation.

7. A washing apparatus comprising a DC motor, a housing enclosing said motor in sealed relation thereto to enable operation of the motor in wet conditions, an elongated rigid handle connected to said housing to enable manual manipulation of the motor and housing, said motor including an output shaft extending externally of the housing in sealed relation thereto, a brush connected to said output shaft externally of the housing, a battery unit connected to said motor to enable the motor to drive said brush, said handle including a yoke, said yoke including a pair of legs straddling said housing and being pivotally connected thereto, said housing including at least one recess in the exterior thereof, at least one leg of said yoke received in said recess, said recess terminating in spaced shoulders in the path of pivotal movement of said at least one yoke leg to limit pivotal movement between said housing and said handle, said yoke and housing including a selectively operable lock device to releasably lock said housing and handle in fixed angular relation, said handle enabling a user of the apparatus to engage all surfaces to be washed with the brush while standing on ground surfaces.

8. The washing apparatus as defined in claim 7, wherein said battery unit is a rechargeable battery.

9. The washing apparatus as defined in claim 8, wherein said rechargeable battery is mounted in a portion of said housing in sealed relation.

10. The washing apparatus as defined in claim 8, wherein said rechargeable battery is mounted on an end portion of said handle remote from the housing to enable the user to support and control movement of the apparatus.

11. The washing apparatus as defined in claim 7, wherein said brush includes a flat disk with bristles extending perpendicularly therefrom, said pivotal connection between said handle and housing enabling the housing and brush to pivot freely to engage various surfaces of the vehicle.

12. The washing apparatus as defined in claim 7, wherein said brush includes a flat disk with bristles extending therefrom in acute angular relation, the bristles at one side of said brush being longer than the bristles at an opposite side, said disk being connected to said shaft at a point spaced from the center of the disk to move the bristles orbitally on a surface to be washed.

13. A cordless rechargeable powered washing system comprising a washing apparatus having a main housing, a DC motor positioned within said main housing, and an output coupling extending from said motor and through said housing, a brush unit detachably connected to said output coupling, an elongate handle attached to said main housing for grasping while in use, and a battery housing attached to said main housing comprising a rechargeable battery receiving section to receive a battery for electrically powering said motor, said battery housing being positioned at the upper end of the main housing, opposite said output coupling.

14. The cordless rechargeable powered washing system of claim 13, wherein said battery housing further includes a cap sealed relative to the housing to seal the interior of the housing.

15. The cordless rechargeable powered washing system of claim 14, wherein said cap includes a switch for switching said battery on and off.

16. The cordless rechargeable powered washing system of claim 15, wherein said battery housing is integral with said main housing.

17. The cordless rechargeable powered washing system of claim 16, wherein said receiving section is defined as a transversely extending tubular housing.

18. A cordless rechargeable powered washing system comprising a washing apparatus having a main housing, a DC motor positioned within said main housing and an output coupling extending from said motor, a brush unit detachably connected to said output coupling, an elongate handle pivotally attached to said main housing for grasping while in use, and a locking mechanism for locking said handle relative to said main housing preventing pivotal movement therebetween, said elongate handle being attached to said main housing by way of a yoke member, said yoke member including yoke legs which flank said main housing and being attached thereto, allowing said pivotal movement of said elongate handle, said locking mechanism being comprised of a first locking member attached to said main housing having a first locking shoulder, a second locking member attached to said yoke leg having a second locking shoulder, and a moveable member cooperable with said first and second locking shoulders to provide a locked position between said yoke leg and said main housing, said moveable member having interlocking shoulders cooperable with said first and second shoulders, to provide said locked position.

19. The cordless rechargeable powered washing system of claim 18, wherein said locking mechanism further comprises a spring member to spring load said movable member into locked position.

20. The cordless rechargeable powered washing system of claim 19, wherein said movable member is linearly movable.

21. A cordless rechargeable powered washing system comprising a washing apparatus having a main housing, a DC motor positioned within said main housing and an output coupling extending from said motor, a brush unit detachably connected to said output coupling, an elongate handle pivotally attached to said main housing for grasping while in use, and a locking mechanism for locking said handle relative to said main housing preventing pivotal movement therebetween, said elongate handle is attached to said main housing by way of a yoke member, said main housing further including stop surfaces to define the extreme pivotal positions for said yoke member.

\* \* \* \* \*